United States Patent [19]
DeGrenier

[11] Patent Number: 6,013,219
[45] Date of Patent: *Jan. 11, 2000

[54] METHOD AND APPARATUS OF INJECTION MOLDING A COVER WITH A HOLE

[76] Inventor: Michael H. DeGrenier, 777 Annoreno Dr., Addison, Ill. 60101

[*] Notice: This patent issued on a continued prosecution application filed under 37 CFR 1.53(d), and is subject to the twenty year patent term provisions of 35 U.S.C. 154(a)(2).

[21] Appl. No.: 08/924,297

[22] Filed: Sep. 5, 1997

Related U.S. Application Data

[63] Continuation of application No. 08/546,099, Oct. 20, 1995, abandoned.

[51] Int. Cl.$^7$ .................................................. B29C 45/20
[52] U.S. Cl. .............................. 264/328.8; 264/328.9; 264/328.12; 425/573
[58] Field of Search ..................... 264/328.8, 328.9, 264/161, 328.15, 328.12; 249/144; 425/549, 567, 568, 577, 573, 570

[56] References Cited

U.S. PATENT DOCUMENTS

| | | | |
|---|---|---|---|
| 2,624,071 | 1/1953 | Strahm et al. | 425/568 |
| 3,281,514 | 10/1966 | Polka | 425/577 |
| 3,380,120 | 4/1968 | Rowland et al. | 425/577 |
| 3,481,002 | 12/1969 | Dreps | 425/577 |
| 3,508,299 | 4/1970 | Ahern | 425/577 |
| 3,537,139 | 11/1970 | Segmüller . | |
| 3,737,272 | 6/1973 | Segmüller . | |
| 4,154,413 | 5/1979 | Hull | 242/311 |
| 4,289,473 | 9/1981 | Von Holdt | 264/328.9 |
| 4,299,372 | 11/1981 | Tomburo et al. | 425/573 |
| 4,448,367 | 5/1984 | Puryear | 242/239 |
| 4,465,651 | 8/1984 | Godschalk, Jr. et al. | 264/328.9 |
| 4,726,925 | 2/1988 | Binder | 264/328.12 |
| 4,881,891 | 11/1989 | Luther | 425/556 |
| 5,009,587 | 4/1991 | Corvaglia et al. | 425/549 |
| 5,013,513 | 5/1991 | Schad et al. | 264/328.8 |
| 5,145,630 | 9/1992 | Schad | 264/328.8 |
| 5,256,350 | 10/1993 | Franzini et al. | 264/102 |
| 5,288,451 | 2/1994 | Schad | 264/328.8 |
| 5,336,078 | 8/1994 | Catoen | 425/556 |
| 5,378,139 | 1/1995 | Schad et al. | 425/549 |

FOREIGN PATENT DOCUMENTS 61-163821  7/1986  Japan ................................. 264/328.9

OTHER PUBLICATIONS

Stoeckhert, Klaus, Mold–Making Handbook, pp. 35–37, 1983.

Rosato et al., Injection Molding Handbook, pp. 160–187, 1986.

*Primary Examiner*—Jill L. Heitbrink
*Attorney, Agent, or Firm*—Sonnenschein Nath & Rosenthal

[57] ABSTRACT

A method and apparatus for injection molding a plastic cover. The method includes the steps of forming a mold having a relatively thin-walled, circular cross-sectional molding area concentric with and along a predominant axis of the mold and of a graded generally decreasing diameter of the cross-sectional molding area from a first end to a second end of the mold along the predominant axis, providing a plurality of passageways in the mold from a periphery of the circular cross-sectional molding area at the second end to an exterior of the mold, and filling the mold through the plurality of passageways.

26 Claims, 1 Drawing Sheet

METHOD AND APPARATUS OF INJECTION MOLDING A COVER WITH A HOLE

This is a continuation of application Ser. No. 08/546,099, filed Oct. 20, 1995, now abandoned.

FIELD OF THE INVENTION

The field of the invention relates to injection molding and in particular to an apparatus and method of making plastic covers with apertures.

BACKGROUND OF THE INVENTION

Injection molding of cone-shaped covers for small consumer products (e.g., covers for closed-face spincast fishing reels) are known. Such covers are typically made of plastic or epoxy with injection molding being the process of choice in the manufacture of such articles.

It is known that in the making of such articles through injection molding, the best yield (i.e., the fewest number of defects) occurs when the plastic is injected at a single, common point and mold filling occurs along a single front of plastic progression. Where the single front of injected plastic is forced to flow around an obstacle (e.g., where an aperture is to be formed in the cover), the single front of plastic is divided into two fronts as plastic flows around each side of the obstacle. As the two fronts flow around the obstacle, they ultimately meet and merge at the far side. Where the two fronts merge, the cooler plastic along the surface of the fronts usually forms a visible seam at the point of contact. The visible seam is referred to as a knit mark or flow mark. The seam in many cases represents a cosmetic defect that usually results in the part being rejected.

Another source of defects occurs where plastic flow stops along a portion of the front in one part of the mold while progression continues in other parts of the mold. Where the flow has stopped, the plastic rapidly cools and solidifies. Where the flow continues, the plastic along the front remains relatively hot and fluid. Where transition points exist between the flowing hot plastic and the stationary, cooler plastic, cracks occur due to differential cooling.

In making covers for closed-faced spincast fishing reels, the injection point (gate) is typically chosen as the area of the tip of the cone-shaped cover where an aperture must later be created through which the fishing line passes (the line aperture). Injection of the plastic typically occurs around a periphery of what will later become the line aperture. After the mold has been filled and the plastic cools, the line aperture is blocked with a puddle of plastic, which must later be removed. The injection of plastic into a mold through such a gate is commonly referred to as a puddle gate. Following injection and cooling, the line aperture is drilled or punched out to create the finished line aperture.

Alternatively, the thickness of the mold gate is restricted around the periphery of the line aperture in what is referred to as a fan aperture. Narrowing the thickness of the cover wall around the periphery of the line aperture reduces the difficulty of later drilling or punching out the finished hole.

While the use of puddle or fan gates around the periphery of a fishing line aperture has been effective in creating covers for closed-face spincast fishing reels, the process is costly and subjects the injected cover to the possibility of other process induced defects in later drilling or punching stages.

Accordingly it is an object of this invention to provide a process and apparatus of injection molding covers with apertures that is less susceptible to the defect rates of previous processes.

It is a further object of the invention to provide a process that has the additional benefit of not requiring the additional steps of drilling or punching for creation of the aperture.

SUMMARY OF THE INVENTION

A method and apparatus for injection molding a plastic cover. The method includes the steps of forming a mold having a relatively thin-walled, circular cross-sectional molding area concentric with and along a predominant axis of the mold and of a graded generally decreasing diameter of the cross-sectional molding area from a first end to a second end of the mold along the predominant axis, providing a plurality of passageways in the mold from a periphery of the circular cross-sectional molding area at the second end to an exterior of the mold, and filling the mold through the plurality of passageways.

DETAILED DESCRIPTION OF A PREFERRED EMBODIMENT

Figure 1A:
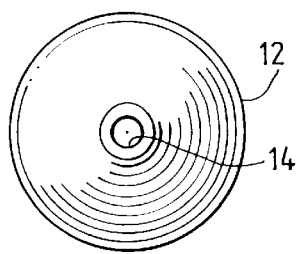
FIGS. 1A and 1B show a plan and elevation view of a cover injection molded in accordance with an embodiment of the invention.
Figure 1B:
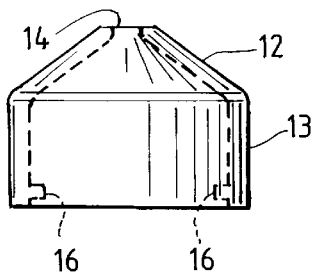

FIGS. 1A and 1B are a top and side view, respectively, of a cone, or hemispherically shaped consumer article 12 (e.g., a cover for a closed-face spin cast fishing reel) made in accordance with the invention. As shown, the cover 12 comprises a relatively thin side wall 13 around a base of the cover 12 which surrounds a fishing line aperture 14 at a top of the cover 12. The cover 12 may also include a pair of lugs 16 near the base of the cover 12 for locking the cover to the body of a closed-face spincast fishing reel.

Figure 2:
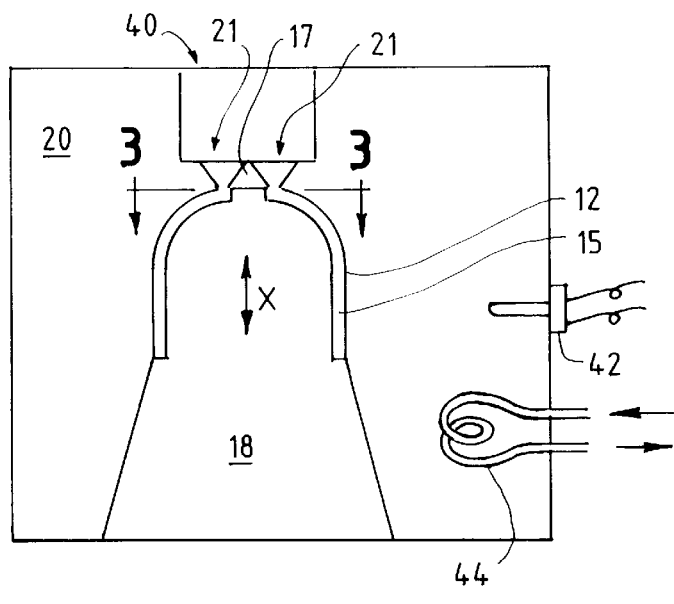
FIG. 2 schematically shows a mold for molding the cover of FIGS. 1A and 1B.

FIG. 2 is a cut-away schematic view of a mold 10 used for molding the cover 12 in accordance with an embodiment of the invention. As shown, the mold 10 generally comprises at least two portions 18, 20. The top mold portion 20 of the mold 10 forms an outer molding surface for the cover 12. The top portion 20 also contains injection gates 21.

The mold 10 is composed of a bottom mold portion 18. The bottom portion 18 forms an inner molding surface for the cover 12. The bottom portion 18 is shown as having a draft along a predominant axis x that allows the bottom portion 18 to be easily separated from the top portion 20 by movement along the axis x. Separating the bottom portion 18 from the top portion 20 provides an easy and convenient method of removing a molded cover 12 from the mold 10.

The assembled top and bottom mold portions 18, 20 form a thin-walled molding volume 15 for the cover 12 with a cross-sectional area that is concentric with the predominant axis x. The molding area 12 has a graded generally decreasing diameter from a bottom to the top of the mold 10 along the predominant axis x.

Figure 3:
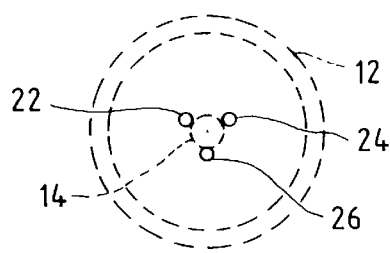
FIG. 3 shows a sectional view of the mold of FIG. 2.

FIG. 3 shows a top, partial sectional view of the mold 10 along dividing line 3 of FIG. 2. As shown, each injection gate 21 of FIG. 2 terminates in a short passageway (pinhole) 22, 24, 26 through which the mold 10 may be filled with plastic material. The number (e.g., 3) and size (e.g., 0.028 inches) of the pinholes 22, 24, 26 are selected based upon a desired fill speed and upon consideration of an acceptable number of rough spots created on the cover 12 by the plastic fracturing in the pinhole 22, 24, 26 as the upper portion 20 of the mold 10 is separated from the lower portion 18.

According to one embodiment of the invention, it has been determined that a superior molded cover 12 may be created with three pinholes 22, 24, 26 distributed around a periphery of the line aperture 14. Distribution of the pinholes 22, 24, 26 around the periphery of the aperture 14 results in the fill material substantially surrounding the aperture 14 without incidence of knit lines or flow marks.

Knit lines and flow marks are eliminated by the number and size of the pin holes 22, 24, 26. As the injection process begins, any cooler plastic which would tend to form a seam between the pin holes 22, 24, 26 is swept into the interior of the mold cavity by the turbulence of the subsequent injection flow through the reduced diameter pin holes 22, 24, 26.

Figure 4:
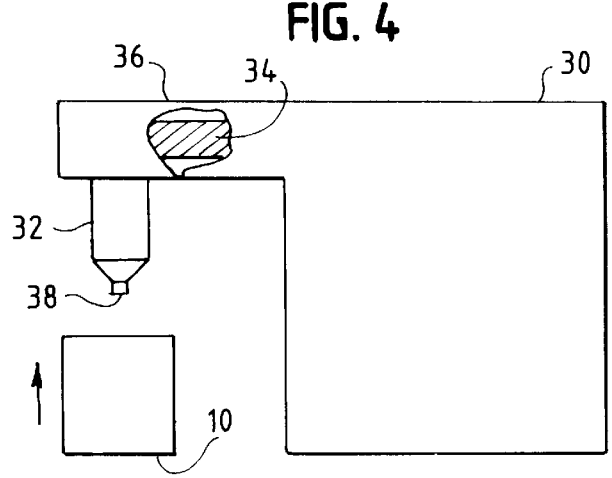
FIG. 4 is a schematic representation of a injection molding maching for injecting the mold of FIG. 2.

FIG. 4 is a schematic block diagram of a mold 10 and injection molding machine 30. Pursuant to the embodiment, the molding machine 30 is augmented with a hot runner 32 to insure that the molded material (e.g., a polyester elastomer, thermoplastic material, or thermosetting material, or plastic molding material) remains fluid during the injection process. The hot runner 32 may be constructed of a tube with electric heaters surrounding the hot runner 32.

In the embodiment of FIG. 4, a heated barrel 36 of the injection machine 30 liquifies the plastic. A screw 34 moves the liquified plastic along the barrel 36 to the hot runner 32. During injection, a tip 38 of the hot runner 32 is pressed into a receptacle 40 (FIG. 2) of the mold 10. Pressure caused by operation of the screw 34 causes the liquified plastic to flow into the mold 10, substantially filling the spaces in mold 10 between mold portions 18, 20. As illustrated in FIG. 2, the upper portion 17 of mold portion 18 extends upward and abuts an adjacent edge of mold portion 20. The molten plastic flows into space 15, and forms in a pattern around upper portion 17. If portion 17 is circular, the aperture 14 is automatically formed in cover 12 during the molding process. This eliminates an extra manufacturing step to form aperture 14 compared to previously known molding equipment and processes.

The mold 10 may be preheated before the injection process to improve plastic flow by placing the mold 10 in a furnace (not shown), or the mold 10 may be equipped with an electric heater 42. After injection the mold 10 may be cooled by water passing through cooling lines 44. Cooling of the mold 10 after injection is provided to more quickly solidify the plastic for ejection of the finished part.

Upon cooling the mold 10, the mold 10 is separated into upper and lower portions 18, 20. After separation, the molded cover 12 with aperture 14 formed therein may be easily removed and the process repeated.

The use of the novel pin hole injection ports 22, 24, 26 results in a mold which is quickly and easily filled. The finished part has a surface relatively free of defects which does not require additional drilling or punching steps to yield an acceptable part.

A specific embodiment of novel apparatus for injection molding a plastic cover according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

I claim:

1. A method of injection molding a plastic cover having interior and exterior surfaces, a centrally-disposed aperture and a diameter which generally increases as it moves from said aperture, comprising the steps of:

provide a separable mold having a relatively thin-walled, circular cross-sectional molding area concentric with and along a predominant axis of the mold and forming said plastic cover having a centrally-disposed aperture and of a graded generally increasing diameter of the cross sectional molding area from said centrally-disposed aperture along the predominant axis; said mold including an upper plug portion to form said centrally-disposed aperture in said cover;

providing at least three passageways in the mold extending from a periphery of the upper plug portion which forms the circular cross-sectional molding area to the exterior of the mold, which passageways are in communication with a portion of the mold which forms the exterior surface of the plastic cover, said passageways located substantially near the upper plug portion which forms the centrally-disposed aperture of the mold;

filling the mold through the at least three passageways through the use of a pinhole connected to an injection gate paired with each passageway, each said injection gate having the ability to fracture when said mold is separated, the plastic cover being free of flow marks resulting from the use of at least three passageways and the plastic cover having a minimal number of rough spots on the exterior surface thereof.

2. The method as in claim 1 wherein the step of filling the mold further comprises the step of injecting a plastic molding material into the molding area of the mold through the plurality of passageways.

3. The method as in claim 1 wherein the step of forming the mold further comprises the step of forming the mold in two separable parts so as to facilitate removal of the molded cover from the mold.

4. The method as in claim 1 wherein the step of providing a plurality of passageways further comprises the step of sizing the passageways to a diameter of substantially 0.038 inches.

5. A method of injection molding a cover of a closed-faced spincast reel, the cover having interior and exterior surfaces, a centrally-disposed aperture and a diameter which generally increases as it moves from said aperture, such method comprising the steps of:

providing a separable mold of the cover of the closed-face spin cast reel including a line aperture, said mold including an upper plug portion to form said centrally-disposed aperture in said cover;

providing at least three passageways in the mold extending from a periphery of the upper plug portion which forms the aperture to an exterior of the mold, said passageways in communication with a portion of the mold which forms the exterior surface of the plastic cover, said passageways located substantially near the upper plug portion which forms the centrally-disposed aperture forming portion of the mold; and filling the mold through at least three pin-holes connected to respective passageways through the use of an injection gate paired with each passageway, each said injection gate having the ability to fracture when the mold is separated, the plastic cover being free of marks resulting from the use of at least three passageways and the plastic cover having a minimal number of rough spots on the exterior surface thereof.

6. The method as in claim 5 wherein the step of filling the mold further comprises the step of injecting a plastic molding material into the molding area of the mold through the plurality of passageways.

7. The method as in claim 5 wherein the step of forming the mold further comprises the step of fabricating the mold in two separable parts so as to facilitate removal of the molded cover.

8. The method as in claim 5 wherein the step of providing a plurality of passageways further comprises the step of sizing the passageways to a diameter of substantially 0.038 inches.

9. A method of forming a centrally-disposed aperture in a plastic article having interior and exterior surfaces and a centrally-disposed aperture and a diameter which generally increases as it moves from said aperture such method comprising the steps of:

providing a separable mold of the plastic article including the aperture, said mold including an upper plug portion which forms said centrally disposed aperture in said cover;

locating a plurality of passageways extending from an interior of the mold and disposed around a periphery of the upper plug portion which forms the aperture to an exterior of the mold, said passageways in communication with a portion of the mold which forms the exterior surface of the article, said passageways located substantially near the upper plug portion which forms the centrally disposed aperture forming portion of the mold; and filling the mold through a plurality of pin-holes connected to the plurality of passageways through the use of an injection gate paired with each passageway that has the ability to fracture when the mold is separated the article being free of flow marks resulting from the molding thereof and the article having a minimal number of rough spots on the exterior surface thereof.

10. An apparatus for injection molding a plastic cover having interior and exterior surfaces, a centrally-disposed aperture and a diameter which generally increases as it moves from said aperture comprising:

a separable mold having a relatively thin-walled, circular cross-sectional molding area concentric with and along a predominant axis of the mold and forming a plastic cover having a centrally disposed aperture and of a graded generally increasing diameter from said centrally disposed aperture along the predominant axis, said mold including an upper plug portion to form said centrally-disposed aperture in said cover;

at least three passageways in the mold extending from an outer periphery of the upper plug portion which forms the circular cross-sectional molding area to the exterior of the mold, which passageways are in communication with a portion of the mold which forms the exterior surface of the plastic cover, said passageways located substantially near the upper plug portion which forms the centrally-disposed aperture, the plastic cover being free of flow marks resulting from the use of at least three passageways;

an injection gate paired with each passageway, each said injection gate having the ability to, fracture when said mold is separated, the plastic cover having a minimal number of rough spots on the exterior surface thereof.

11. The apparatus as in claim 10 a further comprising means for injecting a plastic molding material into the molding area through the plurality of passageways.

12. The apparatus as in claim 11 wherein the molding material further comprises a thermoplastic material.

13. The apparatus as in claim 11 wherein the molding material further comprises a thermosetting material.

14. The apparatus as in claim 11 wherein the molding material further comprises a polyester elastomer.

15. The apparatus as in claim 11 wherein the means for injecting a molding material further comprises an injection molding machine.

16. The apparatus as in claim 10 further comprising means for heating the mold proximate each of the plurality of passageways.

17. The apparatus as in claim 10 wherein the mold includes an aperture forming portion extending axially adjacent the second end of the mold and along the predominant axis interrupting the molding area in a region of the mold area where the aperture is formed in the cover.

18. An apparatus for injection molding a cover of a closed-face spincast reel, the cover having interior and exterior surfaces, a centrally-disposed aperture and a diameter which generally increases as it moves from said aperture, such apparatus comprising:

a separable mold of the cover of the closed-face spin cast reel including a line aperture; said mold including an upper plug portion to form said centrally-disposed aperture in said cover;

at least three passageways in the mold extending from a periphery of the upper plug portion which forms the line aperture to an exterior of the mold, said passageways in communication with a portion of the mold which forms the exterior surface of the plastic cover, said passageways located substantially near the upper plug portion which forms the centrally-disposed aperture forming portion of the mold; and means for filling the mold through the at least three pin-holes connected to the plurality of passageways using an injection gate paired with each passageway that has the ability to fracture when the mold is separated, the plastic cover being free of flow marks resulting from the use of at least three passageways and the plastic cover having a minimal number of rough spots on the exterior surface thereof.

19. The apparatus as in claim 18 further comprising means for injecting a plastic molding material into the molding area through the plurality of passageways.

20. The apparatus as in claim 19 wherein the molding material further comprises a thermoplastic material.

21. The apparatus as in claim 19 wherein the molding material further comprises a thermosetting material.

22. The apparatus as in claim 19 wherein the molding material further comprises a polyester elastomer.

23. The apparatus as in claim 19 wherein the means for injecting a molding material further comprises an injection molding machine.

24. The apparatus as in claim 18 further comprising means for heating the mold proximate each of the plurality of passageways.

25. An apparatus for forming a centrally-disposed aperture in a plastic article having interior and exterior surfaces and a centrally-disposed aperture and a diameter which generally increases as it moves from said aperture, such apparatus comprising:

a separable mold of the plastic article including the aperture, said mold including an upper plug portion to form said centrally-disposed aperture in said cover;

a plurality of passageways passing through the mold for filling the mold from around the periphery of the upper plug portion which forms the aperture, said passageways in communication with a portion of the mold which forms the exterior surface of the article, said passageways located substantially near the upper plug portion which forms the centrally disposed aperture forming portion of the mold; and means for filling the mold through the plurality of pinholes connected to the passageways using an injection gate paired with each passageway that has the ability to fracture when said mold is separated, the article being free of flow marks resulting from the molding thereof and the article having a minimal number of rough spots on the exterior surface thereof.

26. An apparatus for injection molding a plastic cover having interior and exterior surfaces, a centrally-disposed aperture and a diameter which generally increases as it moves from said aperture, the apparatus comprising:

a top mold portion forming an outer molding surface for the plastic cover;

a bottom mold portion forming an inner mold surface for the plastic cover;

the top and bottom mold portions forming a relatively thin-walled separable molding area substantially concentric with and along a predominant axis of the mold;

the bottom mold portion including a substantially circular aperture-forming portion protruding along the predominant axis of the mold and abutting an adjacent surface of the top mold portion;

at least three pinhole injection gates that allow for the fracturing of said injection gates disposed about the periphery of the aperture-forming portion, said passageways in communication with a portion of the mold which forms the exterior surface of the plastic cover, said passageways located substantially near the centrally-disposed aperture forming portion in the mold; and;

such that plastic material injected into the mold through the pinhole gates substantially surrounds the aperture-forming portion and flows through the molding area to form a plastic cover having a circular aperture therein, the cover being free of a flow mark resulting from the injection molding thereof and having a minimal number of rough spots on the exterior surface thereof.

* * * * *